United States Patent
Kato et al.

(10) Patent No.: US 6,998,561 B2
(45) Date of Patent: Feb. 14, 2006

(54) WIRE ELECTRIC DISCHARGE MACHINE

(75) Inventors: Junichi Kato, Yamanashi (JP); Keiichiro Miyajima, Yamanashi (JP); Yasuo Arakawa, Yamanashi (JP); Toshiyuki Ogata, Yamanashi (JP)

(73) Assignee: Fanuc LTD, Yamanashi (JP)

( * ) Notice: Subject to any disclaimer, the term of this patent is extended or adjusted under 35 U.S.C. 154(b) by 0 days.

(21) Appl. No.: 10/689,634

(22) Filed: Oct. 22, 2003

(65) Prior Publication Data

US 2004/0084419 A1  May 6, 2004

(30) Foreign Application Priority Data

Oct. 24, 2002 (JP) ......................................... 2002-310024

(51) Int. Cl.
*B23H 7/06* (2006.01)

(52) U.S. Cl. .................................... 219/69.12; 700/162
(58) Field of Classification Search ............. 213/69.12; 700/166, 162
See application file for complete search history.

(56) References Cited

U.S. PATENT DOCUMENTS 4,703,146 A * 10/1987 Kinoshita ................ 219/69.12
4,843,203 A * 6/1989 Gamo et al. ............. 219/69.12

FOREIGN PATENT DOCUMENTS

| JP | 63-120030 | | 5/1988 | | |
|----|-----------|---|--------|---|---|
| JP | 63-120030 A | * | 5/1988 | ............... | 219/69.12 |
| JP | 4-105820 A | * | 4/1992 | ............... | 219/69.12 |

OTHER PUBLICATIONS

Notice of Grounds of Rejection for corresponding Japanese Application No. 2002–310024 mailed Oct. 26, 2004.

* cited by examiner

*Primary Examiner*—Geoffrey S. Evans
(74) *Attorney, Agent, or Firm*—Staas & Halsey LLP (57) ABSTRACT

A wire electric discharge machine capable of preventing a straightness error from being caused by consumption of a wire electrode, to eliminate insufficient machining. A correction angle $\phi$ is predetermined for preventing the straightness error of the workpiece due to consumption. Correction amounts $d1'$, $d2'$ on a program plane and an upper surface of a workpiece, respectively, are determined based on the predetermined correction angle $\phi$, and are added to or substracted from a predetermined offset amount depending on a wire electrode radius and an electric discharging gap, to determine corrected offset amounts $d1$, $d2$ on the program plane and the upper surface of the workpiece, respectively. Correction amounts dlo, dup for lower and upper wire guides in an offset direction are obtained based on the corrected offset amounts $d1$, $d2$, respectively, so that motion paths of upper and lower wire guides relative to the workpiece are determined.

8 Claims, 7 Drawing Sheets

WIRE ELECTRIC DISCHARGE MACHINE

BACKGROUND OF THE INVENTION

1. Field of the Invention

The present invention relates to control of a wire electric discharge machine, and more particularly to a wire electric discharge machine which prevents machining errors from being caused by wire electrode consumption due to electric discharge.

2. Description of Related Art

A wire electric discharge machine impresses a voltage between the workpiece to be machined and a wire electrode to generate an electric discharge, thereby machining a workpiece into a desired shape. The wire electrode is vertically stretched under tension and fed from a lower side to an upper side or from the upper side to the lower side at a given speed. At a position where the wire electrode faces the workpiece, an electric discharge occurs to remove workpiece materials, whereby machining the workpiece. During the machining, not only the workpiece but also the wire electrode is consumed by the electric discharge.

Figure 7:
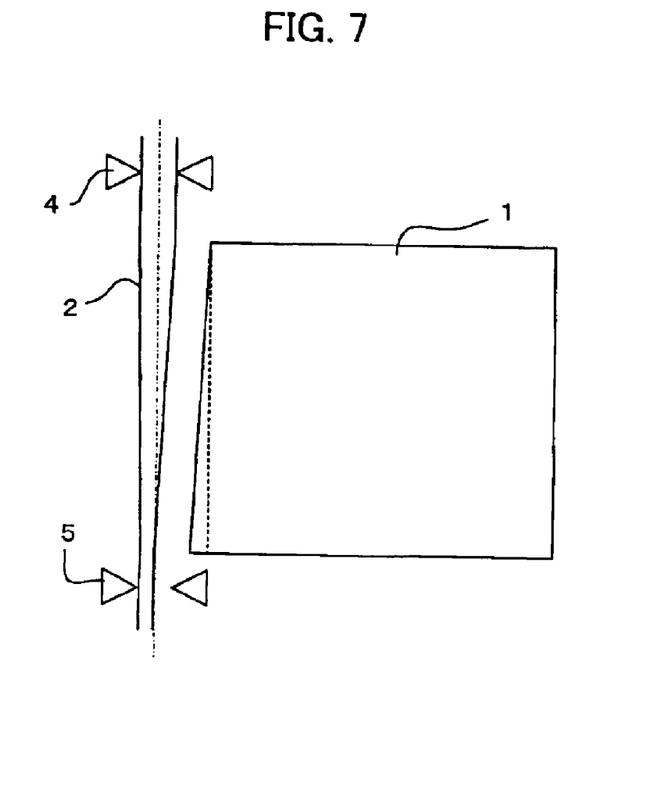
FIG. 7 is a view for explaining why insufficient machining is caused by wire electrode consumption due to electric discharge.
Figure 8A:
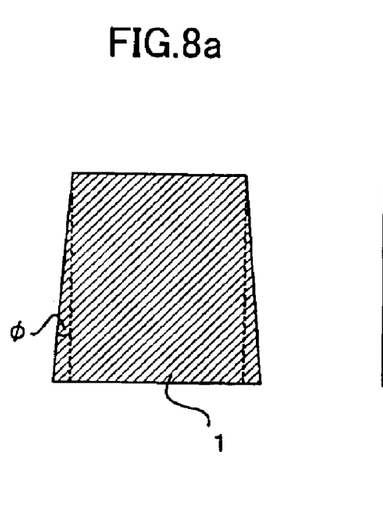
FIG. 8a is a view for explaining insufficient machining caused by wire electrode consumption in punch machining.
Figure 8B:
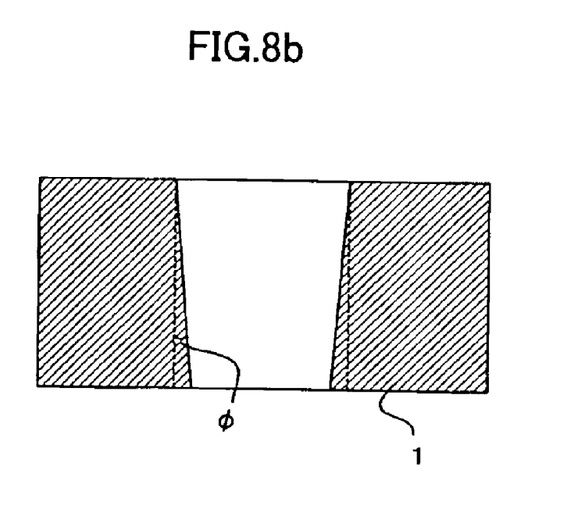
FIG. 8b is a view for explaining insufficient machining in die machining.

In case where the wire electrode is fed downwardly from the upper side to the lower side for instance, the degree of wire electrode consumption increases as the wire electrode moves downwardly. With the advance of the wire movement to the lower side, therefore, a diameter of the wire electrode decreases. On the other hand, an offset amount between a central axis of the wire and a programmed path that specifies a machining shape (i.e., the sum of a wire radius and an amount of gap between the wire electrode and the workpiece) is kept constant. Thus, the amount of gap increases toward the lower side of the workpiece by the amount of decrease of the wire diameter, so that insufficient machining is caused, resulting in a decrease in width of a machined groove and/or in a machined amount. As a consequence, straightness of shape of the machined workpiece is impaired. Specifically, as shown in FIG. 7, the width of the workpiece 1 increases toward the lower side by the amount of decrease of the diameter of the wire electrode 2. In machining of a punch shape, there occurs a case where a workpiece to be machined into a cylindrical shape is machined into a truncated conical shape, as shown in FIG. 8a. In machining of a die shape, there occurs a case where a diameter of a machined hole decreases downwardly in the direction of the wire feed, as shown in FIG. 8b.

Nevertheless, it has not been taken any measures to prevent the influence on the machined shape by the consumption of the wire electrode in conventional wire electric discharge machines.

SUMMARY OF THE INVENTION

The present invention provides a wire electric discharge machine capable of preventing occurrence of an error in machined shape caused by consumption of a wire electrode.

According to one aspect of the present invention, a wire electric discharge machine comprises: storage means storing a straightness-error corrective amount to prevent a straightness error of a wire electrode caused by consumption of the wire electrode due to the electric discharge; and motion path determination means to obtain a first correction amount for a motion path of the wire electrode on a first plane parallel to the workpiece in an offset direction of the wire electrode and a second correction amount for a motion path of the wire electrode on a second plane parallel to the workpiece in the offset direction, based on the straightness-error corrective amount stored in said storage means, and to correct the motion path on the first plane by a first corrected offset amount obtained based on the first correction amount and a predetermined offset amount depending on a wire radius and an electric discharging gap, and to correct the motion path on the second plane by a second corrected offset amount obtained based on the second correction amount and the predetermined offset amount, to thereby determine motion paths of the upper and lower wire guides relative to the workpiece.

According to another aspect of the present invention, a wire electric discharge machine comprises: storage means storing a straightness-error corrective amount to prevent a straightness error of a wire electrode caused by consumption of the wire electrode due to the electric discharge; and motion path determination means to obtain a first correction amount for a motion path of the wire electrode on a first plane parallel to the workpiece in an offset direction of the wire electrode and a second correction amount for a motion path of the wire electrode on a second plane parallel to the workpiece in the offset direction, based on the straightness-error corrective amount stored in said storage means, and to correct the motion path on the first plane by a first corrected offset amount obtained based on the first correction amount and a predetermined offset amount depending on a wire radius and an electric discharging gap, and to correct the motion path on the second plane by a second corrected offset amount obtained based on the second correction amount, the predetermined offset amount and a predetermined taper offset amount for taper machining, to thereby determine motion paths of the upper and lower wire guides relative to the workpiece in the taper machining.

The motion path determination means may obtain the first corrected offset amount on the first plane and the second corrected offset amount on the second plane different with each other, to thereby make different corrections to the motion paths on the first and second planes.

The straightness-error corrective amount may be given by a value of an angle, or a tangent of an angle.

The storage means may comprise a database provided in a controller of the wire electric discharge machine for storing a plurality of straightness-error corrective amounts for different kinds of wire electrodes and machining conditions. In this case, the straightness-error corrective amount may be selected from the plurality of straightness-error corrective amounts stored in the database in accordance with a kind of the wire electrode and a machining condition designated for the wire electric machining in the controller.

DETAILED DESCRIPTION

With regard to machining of a workpiece made of a certain material, the straightness error caused by wire electrode consumption is uniquely determined depending on kind of a wire electrode, machining conditions (such as tension applied to and feed speed of the wire electrode, voltage applied between the wire electrode and the workpiece, amount of working water supply, machining speed, etc.), and thickness of the workpiece. Thus, in the present invention, straightness errors are measured in advance, and, at the time of machining, a motion path instructed by the program is corrected by using a correction angle, as corrective amount, determined based on the straightness error, thereby preventing shape errors from being caused by wire electrode consumption due to electric discharge.

Figure 1:
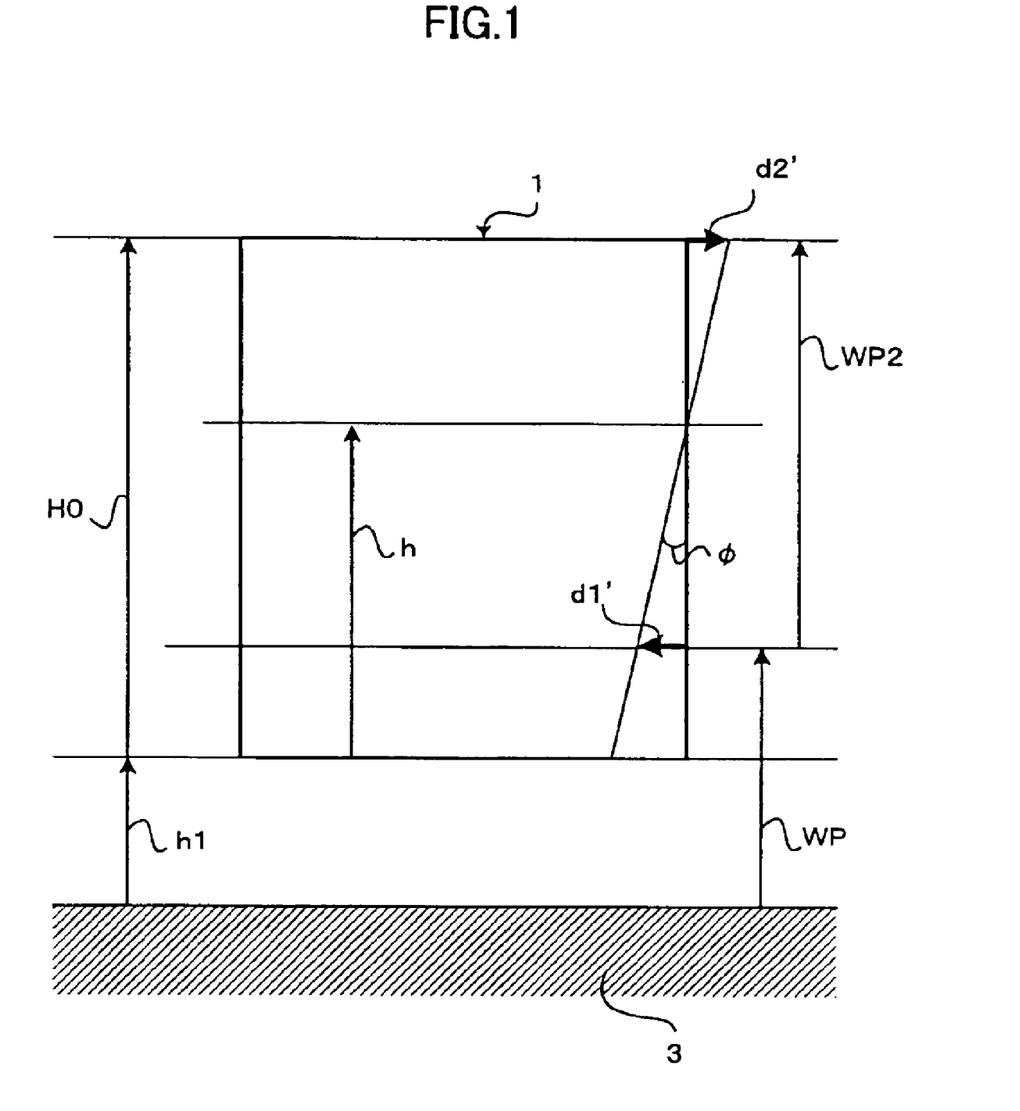
FIG. 1 is a view for explaining the principle of this invention of preventing a straightness error which may be caused by consumption of a wire electrode.

FIG. 1 is a view for explaining the principle of this invention of preventing the straightness error which may be caused by wire electrode consumption.

In FIG. 1, symbol h ($0 \leq h \leq H0$(workpiece thickness)) denotes a height from a lower surface of a workpiece, which surface serves as a reference plane against which a wire electrode is inclined to prevent the straightness error; WP denotes a distance from an upper surface of a workpiece bed 3, which distance indicates a position of a program plane in which the workpiece 1 is machined into a shape specified by the machining program; WP2 denotes a distance from the position of the program plane to an upper surface of the workpiece; h1 denotes a height from the upper surface of the workpiece bed 3 to the lower surface of the workpiece (h1 is considered in workpiece machining, which is performed with workpiece raised from the workpiece bed 3 by using such as a subtable); and $\phi$ (see FIGS. 8a and 8b) denotes a correction angle determined so as to compensate for the straightness error which may be caused by wire electrode consumption. In this invention, a correction amount d1' on the program plane (a first plane) and a correction amount d2' on the upper surface of the workpiece (a second plane different from the program plane) are determined by the calculations in accordance with the following equations (1), (2):

$$d1' = \{(h+h1) - WP\} \tan \phi \quad (1)$$

$$d2' = \{(WP+WP2) - (h+h1)\} \tan \phi \quad (2)$$

By correcting the machining shape instructed by the program in an offset direction by using the correction amount d1', a corrected machining shape on the program plane is attained. Similarly, by correcting the instructed machining shape in the offset direction by using the correction amount d2', a corrected machining shape on the upper surface of the workpiece (another plane different from the program plane) is attained.

The machining shape instructed by the machining program indicates a path along which the center axis of the wire electrode 2 is to be moved. On the other hand, the wire electrode has its size (diameter) and an electric discharging gap should be provided, so that the intended machining shape cannot be attained when machining is performed according to the programmed path that is as it is. For this reason, the motion path for the center axis of the wire electrode is offset from the programmed path to the right or to the left, so as to be away from those portions of the workpiece which constitute a final product, thereby correcting the machining shape. That is, an offset correction is performed to determine a path which is offset (hereinafter, this offset is referred to as wire diameter offset) from the path corresponding to the programmed machining shape to the right or to the left by an offset amount that is obtained by adding an amount of the electric discharging gap to a radius of the wire electrode.

Conventionally, the offset amount for the wire diameter offset is always at constant in the thickness direction of the workpiece. Specifically, when performing machining with a certain offset amount, an offset amount used to calculate an offset path on the lower surface of the workpiece (program plane) is also applied to the calculation for an offset path on the upper surface of the workpiece (another plane different from the program plane). Contrary to this, the present invention calculates a path on the program plane and a path on another plane independently of each other by applying different offset amounts to the path calculations on these planes, with the intention of preventing the straightness error which may be caused by the wire electrode consumption.

Here it is assumed that an offset amount set for wire diameter offset (which is equal to the sum of an amount of electric discharging gap and the radius of the wire electrode) is represented by d0. In this invention, the aforementioned correction amounts d1' and d2' on the program plane and the upper surface of the workpiece (i.e., another plane different from the program plane) are added to or subtracted from the just-mentioned offset amount d0, to thereby independently determine offset paths on these planes which further take into account of the straightness error which may be caused by wire electrode consumption.

If the wire electrode 2 is fed from an upper side to a lower side in FIG. 1, the wire electrode is thinned due to wire electrode consumption caused by electric discharge as it moves toward the bottom of the workpiece 1. For this reason, as shown in FIG. 8a for a punch shape and FIG. 8b for a die shape, the machined workpiece 1 broadens in shape toward the bottom. In other words, insufficient machining is caused in the shape of lower part of the workpiece.

In this regard, a correction for preventing an error which may be caused by consumption of the wire electrode 2 is added to the ordinary wire diameter offset correction, so as to make a correction in the direction to prevent the tendency of broadening toward bottom. An offset amount d1 on the program plane that takes into account of the straightness error due to wire electrode consumption (hereinafter referred to as the corrected offset amount) is determined by subtracting the correction amount d1' from the wire diameter offset amount d0, as shown in the following equation (3). On the other hand, as shown in FIG. 1, the correction amount d2' on the upper surface of the workpiece (another plane different from the program plane) is to be applied in the direction that is opposite to the direction of applying the correction amount d1' on the program plane. Hence, a corrected offset amount d2 is determined by adding the correction amount d2' to the wire diameter offset amount d0, as shown in the following equation (4):

$$d1 = d0 - |d1'| \quad (3)$$

$$d2 = d0 + |d2'| \quad (4)$$

When the wire electrode is fed from the lower side to the upper side in FIG. 1, on the other hand, there is an inverse relationship between the correction amounts and the wire diameter offset amount, so that the corrected offset amounts d1 and d2 are represented by the following equations (5), (6):

$$d1 = d0 + |d1'| \quad (5)$$

$$d2 = d0 - |d2'| \quad (6)$$

Figure 2:
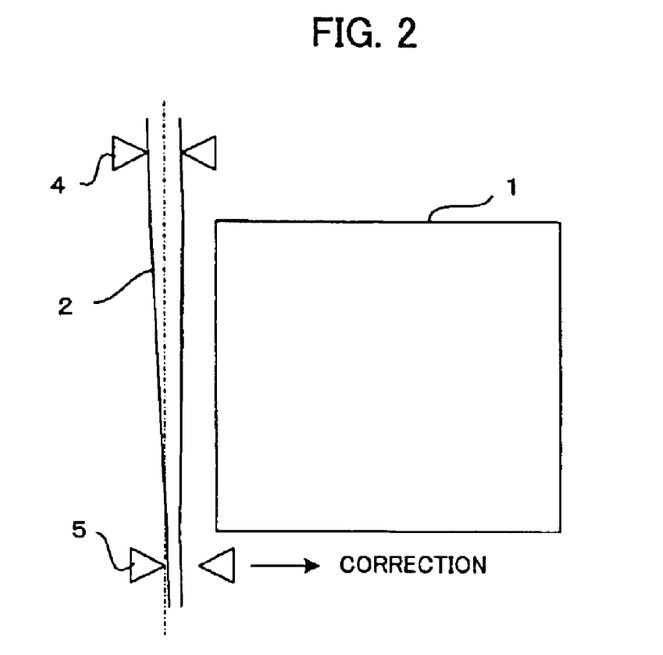
FIG. 2 is a view for explaining an offset correction in this invention in a case where a lower surface of a workpiece serves as a reference plane against which a wire electrode is inclined to prevent the straightness error.

If the height h of the reference plane is equal to the height H0 of the workpiece, the correction amount d2' on the workpiece's upper surface (another plane different from the program plane) is determined to be 0 in accordance with equation (2). Thus, on the workpiece's upper surface (another plane different from the program plane), the corrected offset amount d2 is equal to d0, so that it is sufficient to perform only the ordinary wire diameter offset correction. On the program plane, the correction is performed by using the corrected offset amount d1(=d0−{(H0+h1)−WP}tan φ), as shown by arrow in FIG. 2.

Figure 3:
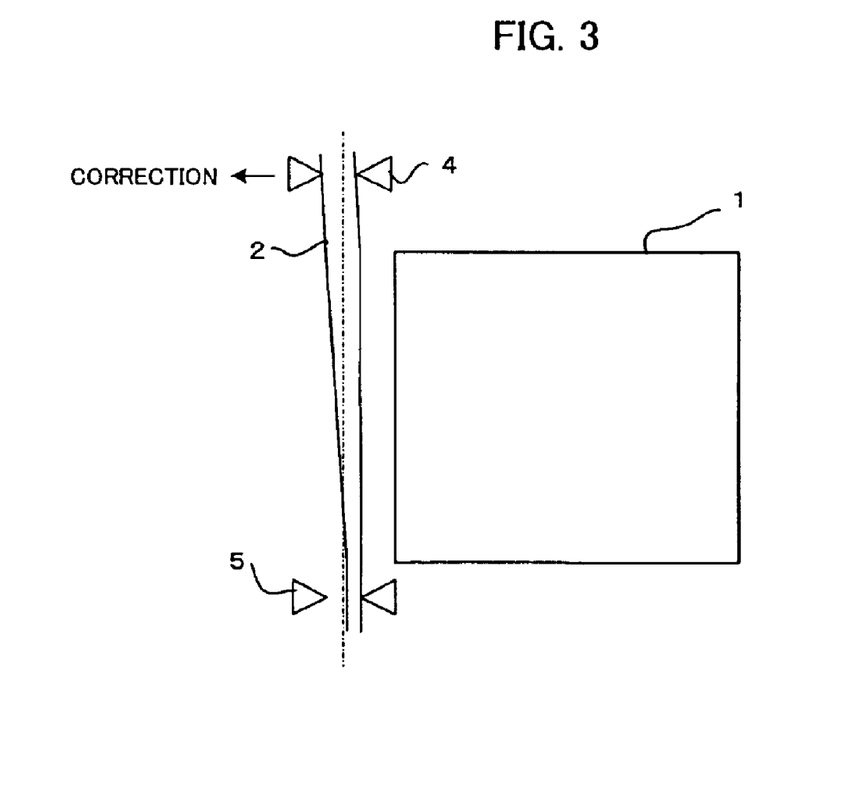
FIG. 3 is a view for explaining the offset correction in this invention in a case where a program plane is at a lower surface of a workpiece serving as the reference plane.

If the height h of the reference plane is 0 and hence the program plane is at the workpiece's lower surface (h1=WP), the correction amount d1' on the program plane is determined to be 0 from equation (1). As for the workpiece's upper surface (another plane different from the program plane), the relationships of h1=WP and WP2=H0 are satisfied, so that the correction amount d2' on the workpiece's upper surface is determined from equation (2) as follows: d2'=WP2 tan φ=H0 tan φ. Thus, the corrected offset amount d2 on the workpiece's upper surface (another plane different from the program plane) is determined by the equation of: d2=d0+WP2 tan φ=do+H0 tan φ, and the correction is made as shown by arrow in FIG. 3. As for the program plane (workpiece's lower surface), only the ordinary wire diameter offset correction is made by using the corrected offset amount d1 (=d0).

Figure 4:
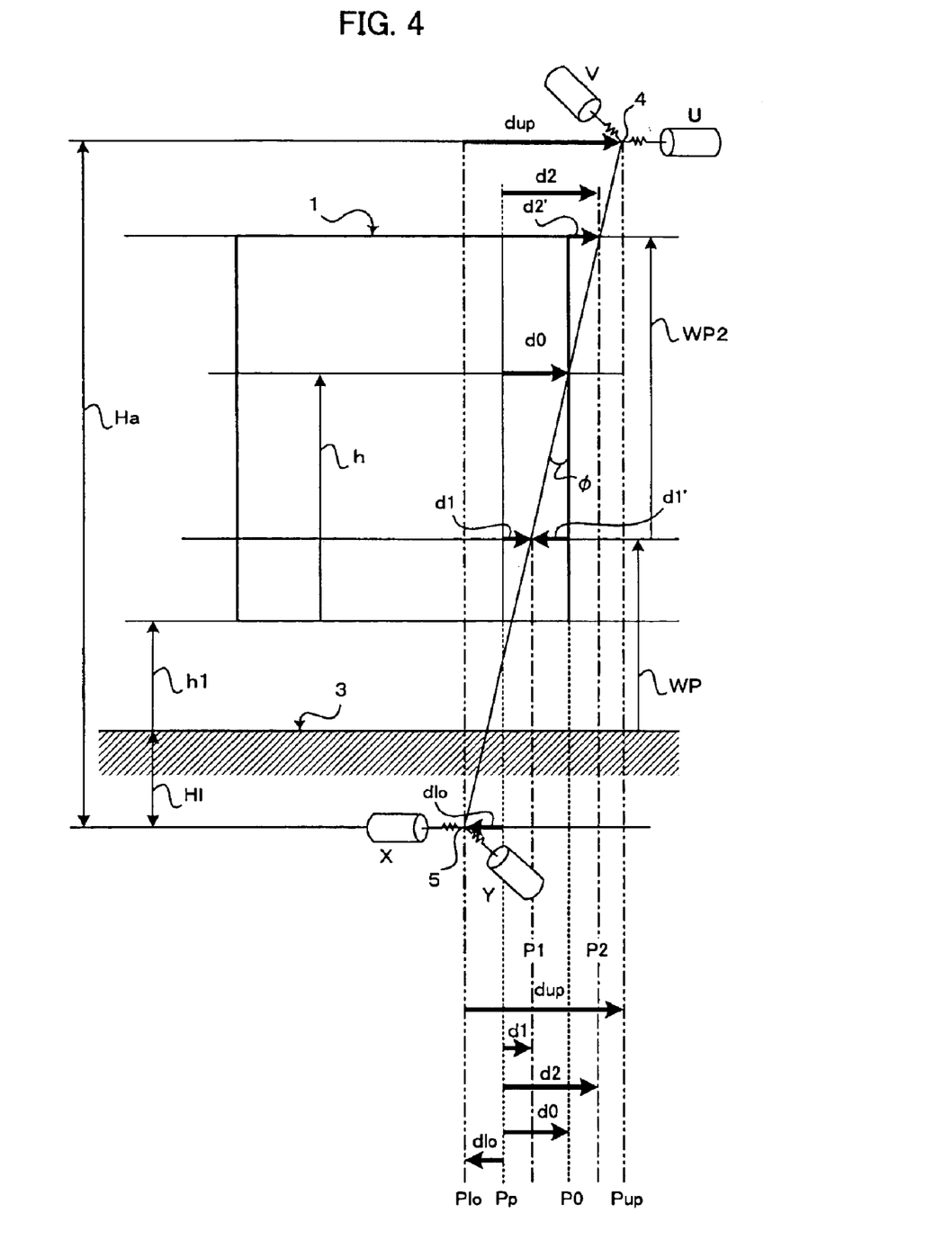
FIG. 4 is a view for explaining by what amounts upper and lower wire guides are moved for the offset correction in this invention.

The wire electrode 2 is supported by upper and lower wire guides 4 and 5. As shown in FIG. 4, the upper wire guide 4 is usually disposed at a location above the upper surface of the workpiece, whereas the lower wire guide 5 is usually disposed at a location below a workpiece mounting surface of the workpiece bed 3. The lower wire guide 5 is moved relative to a table on which the workpiece and the workpiece bed 3 are fixed, so as to move along the path determined by using the offset amount on the program plane. The upper wire guide 4 is moved relative to the lower wire guide 5 so as to move along the path determined by using offset amount on the workpiece's upper surface (another plane different from the program plane). The lower wire guide 5 is coupled to servomotors for driving the lower wire guide 5 in the directions of the perpendicular X and Y axes. With this arrangement, the lower wire guide 5 and the table are moved relative to each other by moving the lower wire guide 5 with respect to the table that is fixed. Alternatively, the wire electric discharge machine may be arranged that the lower wire guide 5 is fixed and the table that is movable is coupled to servomotors. Any type of wire electric discharge machine can be used so long as the lower wire guide and the table can be moved relative to each other.

The upper wire guide 4 is coupled to servomotors for driving it in the directions of U and V axes extending perpendicular to each other, as with the X and Y axes.

In order to make corrections in an offset direction by the corrected offset amounts d1, d2 on the program plane and the workpiece's upper surface (another plane different from the program plane), the lower and upper wire guides 5, 4 should be shifted from the programmed shape and the lower wire guide 5 by a correction amount dlo and a correction amount dup, respectively, which amounts are represented as follows:

$$dlo = \frac{(h + h1 + H1) - d0/\tan\phi}{(WP + H1) - (h + h1 + H1 - d0/\tan\phi)} \cdot d1 \quad (7)$$

$$= \frac{h + h1 + H1 - d0/\tan\phi}{WP - h - h1 + d0/\tan\phi} \cdot d1$$

$$dup = \frac{Ha}{(WP + WP2 + H1) - \{(h + h1 + H1) - d0/\tan\phi\}} \cdot d2 \quad (8)$$

$$= \frac{Ha}{WP + WP2 - h - h1 + d0/\tan\phi} \cdot d2$$

where H1 denotes a distance between the upper surface of the workpiece bed 3 and the lower wire guide 5, and Ha denotes a distance between the lower wire guide 5 and the upper wire guide 4.

The correction amounts dlo, dup can be determined by substituting the right sides of equations (3), (4) individually into d1, d2 of equations (7), (8) for a case where the wire electrode is fed from the upper side to the lower side, and by substituting the right sides of equations (5), (6) individually into d1, d2 of the equations (7), (8) for a case where the wire electrode is fed from the lower side to the upper side. In case that the wire electrode is fed from the upper side to the lower side, the correction amounts dlo, dup are determined as follows:

$$dlo = \frac{h + h1 + H1 - d0/\tan\phi}{WP - h - h1 + d0/\tan\phi} \cdot \{d0 - |(h + h1 - WP)\tan\phi|\} \quad (9)$$

$$dup = \quad (10)$$

$$\frac{Ha}{WP + WP2 - h - h1 + d0/\tan\phi} \cdot \{d0 + |(WP + WP2 - h - h1)\tan\phi|\}$$

By shifting the programmed machining shape by the correction amount dlo in an offset direction, a motion path for the lower wire guide 5 can be determined, whereas a motion path for the upper wire guide 4 can be determined by shifting the motion path for the lower wire guide 5 by the correction amount dup in an offset direction (refer to FIG. 4). These motion paths are instructed to servomotors coupled to the upper and lower wire guides 4, 5, respectively.

Figure 5:
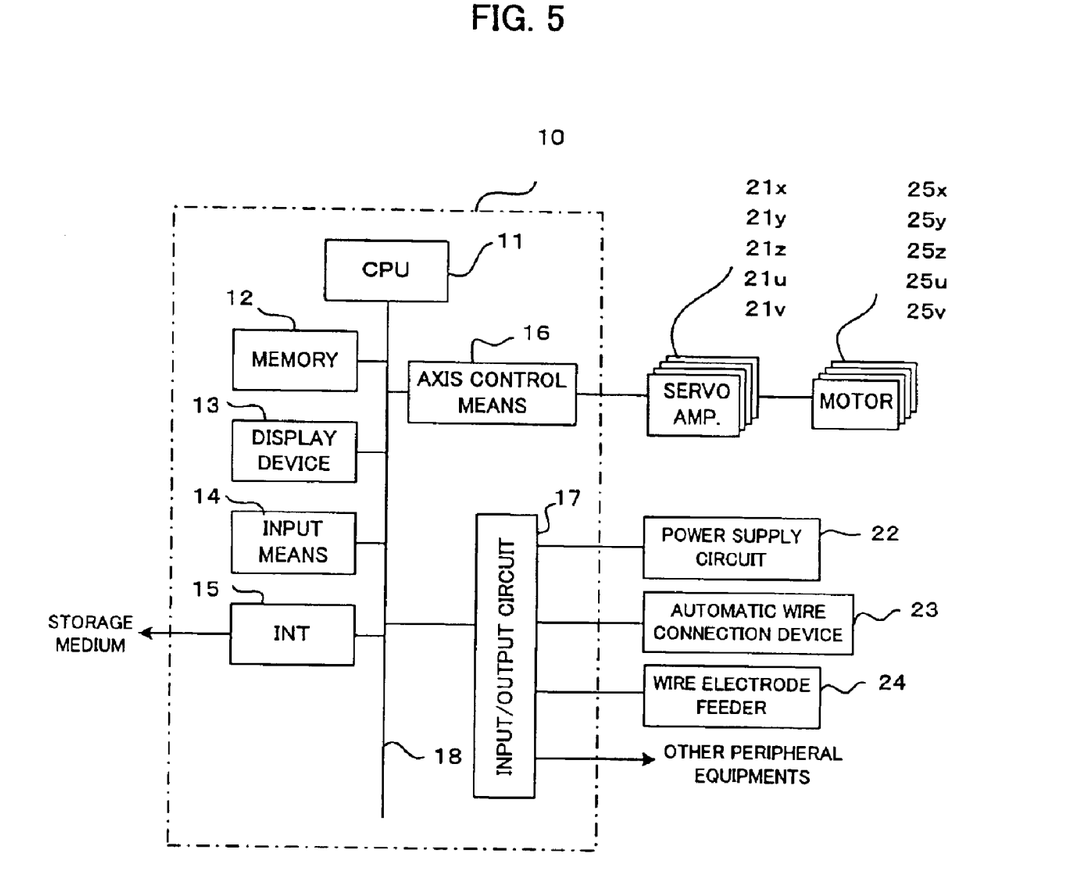
FIG. 5 is a block diagram showing essential parts of a wire electric discharge machine according to an embodiment of this invention.

FIG. 5 is a block diagram of a wire electric discharge machine according to an embodiment of this invention. Reference numeral 10 denotes a controller comprised for instance of a numerical control unit for controlling the wire cut electric discharge machine. For instance, the controller 10 includes a processor 11, a memory 12 comprised of a ROM, a RAM, etc. that are connected to the processor 11 through a bus 18, a display device 13, input means 14 such as a keyboard, an interface 15 through which machining program, etc. are input from or output to an external storage medium, axis controlling means 16, and an input/output circuit 17.

The axis controlling means 16 serves to control X and Y axis servomotors 25x, 25y for driving a lower wire guide 5 in the perpendicular X and Y axis directions, respectively, a Z axis servomotor 25z for driving an upper wire guide 4 in the direction perpendicular to the X and Y axes, and U and V axis servomotors 25u, 25v for driving the upper wire guide 4 in the perpendicular U and V axis directions to carry out taper machining and/or a correction for preventing the straightness error which may be caused by wire electrode consumption. The axis controlling means 16 is constituted by such as a processor and a memory, and performs position, velocity and current feedback controls for the individual axes. Axis servomotors 25x, 25y, 25z, 25u and 25v are connected to the axis controlling means 16 through servo amplifiers 21x, 21y, 21z, 21u and 21v for the respective axes. Although the servomotors 25x, 25y, 25z, 25u and 25v are each mounted with a position/velocity detector and designed to perform position/velocity feedback to the axis controlling means 16, illustrations are omitted in FIG. 5.

Connected to the input/output circuit 17 are an electric power circuit 22 for applying a voltage between the wire electrode 2 and the workpiece 1 to cause electric discharge to occur therebetween, an automatic wire connecting device 23 for causing the wire electrode to pass through a machining start hole formed in the workpiece, a wire electrode feeder 24 for feeding the wire electrode, and other peripheral equipment.

The aforementioned construction of the wire electric discharge machine is substantially the same as that of conventional ones.

According to this embodiment, straightness errors are measured in advance while performing machining operations under various combinations in respect of workpiece material, wire electrode, machining conditions, workpiece thickness. Then, values of correction angle $\phi$ or values of tangent $\phi$, as the corrective amount, individually corresponding to the above combinations and used to prevent the straightness error are determined and stored in the form of database in a non-volatile RAM of the memory of the controller 10 of the wire electric discharge machine.

Prior to start of wire electric discharge machining, an operator operates the input means 14 of the controller 10 to set, into the controller, the kind of material and thickness of a workpiece to be machined and the kind of a wire electrode, and select and set the machining conditions for achieving the required machining accuracy while utilizing a machining condition setting screen displayed on the display device 13 of the controller 10. The machining program can include a command for selecting and setting machining conditions. When such command in the machining program is executed, a correction angle $\phi$ to prevent the straightness error is determined referring to the aforesaid database.

An offset amount d0 for wire diameter offset, a position WP of a program plane, a distance WP2 between the program plane and an upper surface of the workpiece, and a height h of a reference plane are set and stored in the memory of the controller 10. Also, a distance h1 between an upper surface of the workpiece bed 3 and a lower surface of the workpiece, a distance H1 between the upper surface of the workpiece bed 3 and the lower wire guide 5, and a distance Ha between the lower wire guide 5 and the upper wire guide 4 are also set and stored in the memory.

Figure 6:
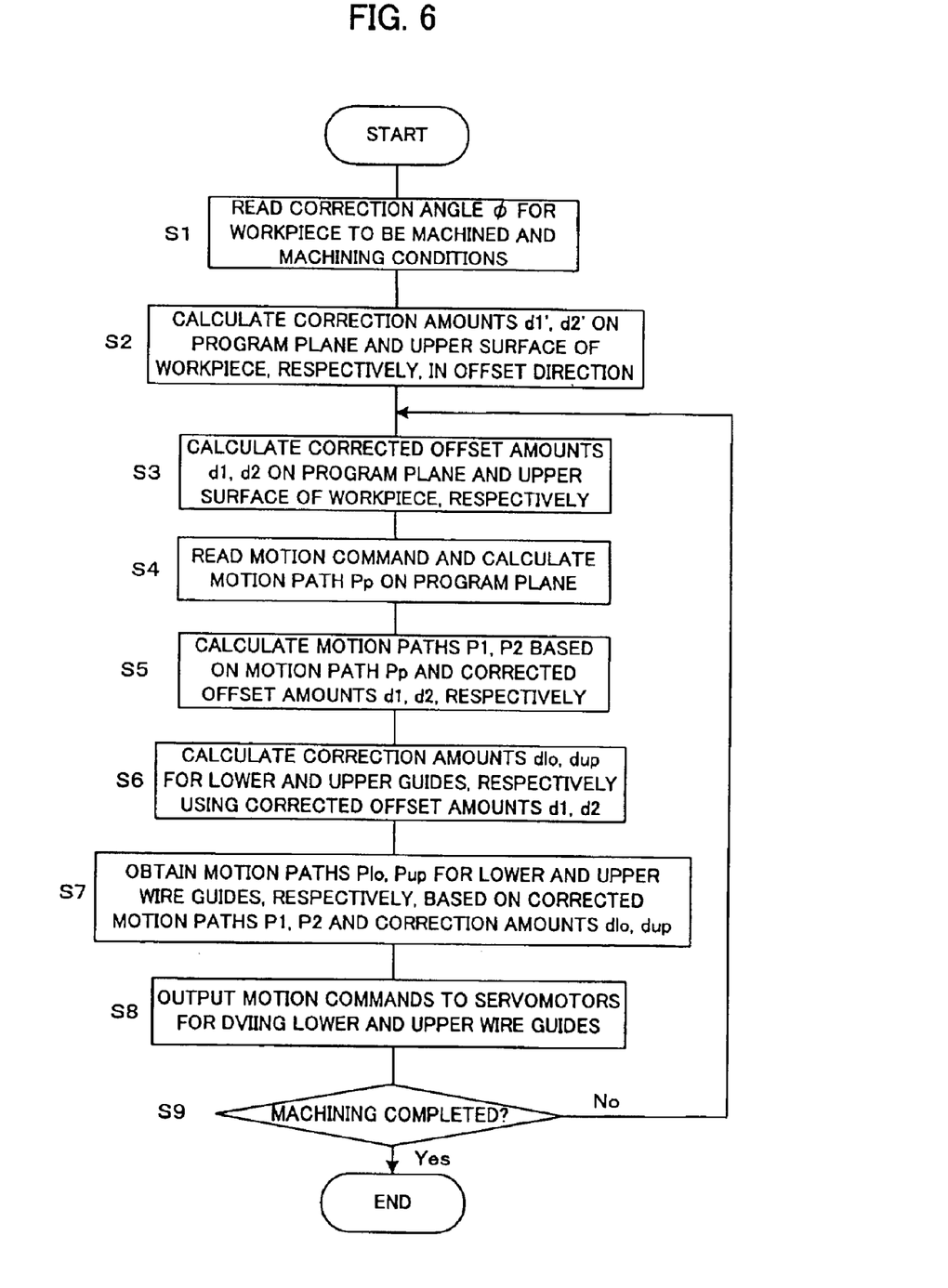
FIG. 6 is a flowchart of a motion command output routine in the wire electric discharge machine of the same embodiment.

When a machining command is input, the processor 11 compares the set combination of the material and thickness of the workpiece, the kind of wire electrode and the machining conditions with data in the database, finds a combination which is the same as or closest to the set combination from the database, and determines the correction angle $\phi$ to prevent the straightness error corresponding to the combination found from the database (Step S1). Based on the determined correction angle $\phi$ and the set data, the processor performs calculations in accordance with the equations (1) and (2), to thereby calculate correction amounts d1' and d2' on the program plane and on the upper surface of the workpiece (another plane different from the program plane) to prevent the straightness error which may be caused by wire electrode consumption (Step S2). Next, the correction amount d1' is added to or subtracted from the correction amount d0 for wire diameter offset and the correction amount d2' is added thereto or subtracted therefrom, to thereby determine corrected offset amounts d1, d2 on the program plane and the upper surface of the workpiece (another plane different from the program plane) (Step S3). Next, the processor reads a motion command from one block of the machining program and determines a motion path Pp on the program plane (Step S4). Then, the corrected motion paths P1, P2 are determined by correcting the motion path Pp in an offset direction by using the corrected offset amounts d1, d2 that are determined at Step S3, respectively (Step S5).

Next, correction amounts dlo, dup for the lower and upper wire guides associated with the offset correction are calculated based on the corrected offset amounts d1, d2 determined at Step S3 (Step S6). Then, motion paths Plo, Pup for the lower and upper wire guides are calculated based on the corrected motion paths P1, P2 determined at Step S5 and the correction amounts dlo, dup for the lower and upper wire guides determined at Step S6 (Step S7). Next, motion commands corresponding to the determined motion paths Plo, Pup determined at Step S7 are output to the servomotors 25x, 25y, 25z, 25u and 25v for driving the lower and upper wire guides 5, 4 (Step S8), and whether or not machining is completed is determined (Step S9). If the machining is not completed as yet, the flow returns to Step S3. The processing from Step S3 to Step S9 is repeatedly executed until the machining is completed.

In the following, taper machining will be explained.

Figure 9A:
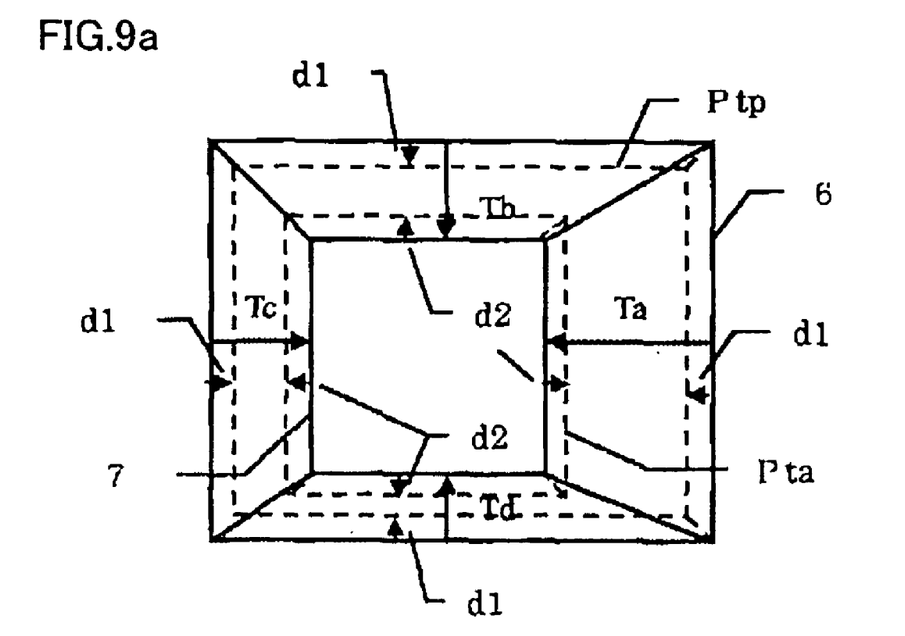
FIG. 9a is a plan view showing motion paths on a program plane and an upper surface of a workpiece in a case where the straightness error correction of this invention is applied to taper machining.
Figure 9B:
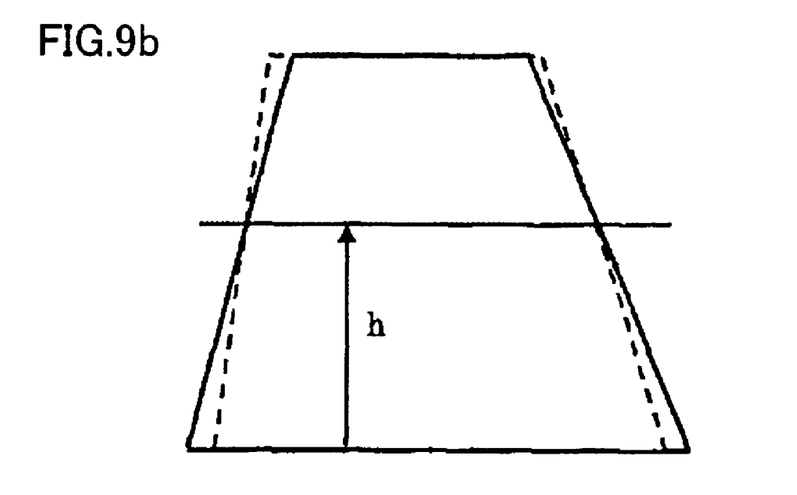
FIG. 9b is a side view of the motion paths.

Taper machining is intended to form an inclined face in a workpiece, and is performed by moving the upper and lower wire guides in such a manner that relative deviations are provided between amounts of travel of the upper wire guide in the perpendicular U and V axis directions and amounts of travel of the lower wire guide in the perpendicular X and Y axis directions. FIGS. 9a and 9b show an example of taper machining, in which a workpiece is seen from above and from side, respectively. In the illustrated example, the workpiece is formed into a rectangular shape on a program plane, and deviations Ta, Tb, Tc and Tc (hereinafter referred to as taper offset amounts) are provided between a periphery of the workpiece on the program plane and that on an upper surface of the workpiece (another plane different from the program plane). For simplicity of the illustration, it is assumed that the program plane is at the lower surface of the workpiece.

Even in taper machining, a wire electrode is consumed by electric discharge and thinned in diameter as it moves downward, if the wire electrode is fed from the upper side to the lower side, whereas a wire diameter offset amount is kept constant in the prior art for both a program plane and an upper surface of a workpiece (another plane different from the program plane), as in vertical machining. Thus, an amount of gap increases toward the bottom of the workpiece by the amount of decrease in wire diameter, so that insufficient machining is caused, resulting in a decrease in width of a machined groove and/or in a machined amount. As a result, the width of the workpiece being machined increases toward bottom by the amount of the wire electrode being thinned, making it impossible to provide a machined surface with an inclination angle as instructed. As for a punch shape, if a taper shape broadens toward bottom, the workpiece is machined into a shape which is excessively large in width at the bottom and in taper angle.

According to another embodiment of this invention, even in taper machining, a correction angle stored in advance in a controller is used to correct a motion path instructed by the program, making it possible to prevent a shape error from being caused by wire electrode consumption due to electric discharge, as in the case of vertical machining.

The principle of correction in taper machining is the same as that for vertical machining. If the just-mentioned correction angle is represented by φ, a correction amount d1' on a program plane and a correction amount d2' on an upper surface of a workpiece (another plane different from the program plane) are calculated in accordance with equations (1), (2), and corrected offset amounts d1, d2 are calculated in accordance with equations (3), (4), respectively.

In response to a program command, a motion path on the program plane is calculated, and a motion path on the upper face of the workpiece (another plane different from the program plane) is calculated in response to an inclination angle command in the program. The latter motion path is deviated from the motion path on the program plane by taper offset amounts, as shown in FIGS. 9a and 9b. Next, a motion path Ptp is determined by correcting the motion path on the program plane in an offset direction by using a corrected offset amount d1, and a motion path Pta is determined by correcting the motion path on the upper surface of the workpiece (another plane different from the program plane) in an offset direction by using a corrected offset amount d2. The motion paths Ptp, Pta shown in FIG. 9a are determined with respect to a reference plane for correction h that is set between the program plane and the upper surface of the workpiece (another plane different from the program plane), as shown in FIG. 9b. As in the case of vertical machining, it is possible to determine and correct motion paths of lower and upper wire guides based on the motion paths Ptp, Pta.

According to the present invention, both in vertical machining and taper machining, a relative position between the wire electrode and the workpiece is so corrected that a gap therebetween is kept constant, thereby preventing errors in machined shape from being caused by wire electrode consumption due to electric discharge, so that machined shape is consistent with instructed shape over the entire thickness of the workpiece, whereby highly accurate machined shape can be attained.

The present invention is not limited to the foregoing embodiments, and may be modified variously.

In the foregoing embodiments, the description has been made on the case where values of correction angle φ used to prevent the straightness error caused by wire electrode consumption are stored beforehand in the form of database. Alternatively, values of correction angle φ may be input each time machining is started. Further, a value of tangent of the correction angle φ may be used directly in place of a value of the correction angle φ to obtain the correction amount d1' on the program plane and correction amount d2' on the upper surface of the workpiece so that the corrected offset amounts d1 and d2 are calculated to obtain the motion paths of the upper and lower wire guides, respectively, relative to the workpiece. Furthermore, in the embodiments, Steps S2 and S3 are provided, in which correction amounts d1', d2' used to prevent the straightness error caused by wire electrode consumption are determined, and corrected offset amounts d1, d2 are determined that are used to calculate correction amounts dlo, dup. Alternatively, the correction amounts dlo, dup may be calculated directly by calculations in accordance with equations (9), (10). In other respects, the present invention may be modified without departing from the scope of the invention.

What is claimed is:

1. A wire electric discharge machine for machining a workpiece by electric discharge between the workpiece and a wire electrode arranged between upper and lower wire guides, comprising:

storage means storing a straightness-error corrective amount to prevent a straightness error of a wire electrode caused by consumption of the wire electrode due to the electric discharge; and motion path determination means to obtain a first correction amount for a motion path of the wire electrode on a first plane parallel to the workpiece in an offset direction of the wire electrode and a second correction amount for a motion path of the wire electrode on a second plane parallel to the workpiece in the offset direction, based on the straightness-error corrective amount stored in said storage means, and to correct the motion path on the first plane by a first corrected offset amount obtained based on the first correction amount and a predetermined offset amount depending on a wire radius and an electric discharging gap, and to correct the motion path on the second plane by a second corrected offset amount obtained based on the second correction amount and the predetermined offset amount, to thereby determine motion paths of the upper and lower wire guides relative to the workpiece, wherein said storage means comprises a database provided in a controller of the wire electric discharge machine for storing a plurality of straightness-error corrective amounts for different kinds of wire electrodes and machining conditions, and the straightness-error corrective amount is selected from the plurality of straightness-error corrective amounts stored in the database in accordance with a kind of the wire electrode and a machining condition designated for the wire electric machining in the controller.

2. A wire electric discharge machine according to claim 1, wherein said motion path determination means obtains the first corrected offset amount on the first plane and the second corrected offset amount on the second plane different with each other, to thereby make different corrections to the motion paths on the first and second planes.

3. A wire electric discharge machine according to claim 1, wherein the straightness-error corrective amount is given by a value of an angle.

4. A wire electric discharge machine according to claim 1, wherein the straightness-error corrective amount is given by a tangent of an angle.

5. A wire electric discharge machine for machining a workpiece by electric discharge between the workpiece and a wire electrode arranged between upper and lower wire guides, comprising:

storage means storing a straightness-error corrective amount to prevent a straightness error of a wire electrode caused by consumption of the wire electrode due to the electric discharge; and motion path determination means to obtain a first correction amount for a motion path of the wire electrode on a first plane parallel to the workpiece in an offset direction of the wire electrode and a second correction amount for a motion path of the wire electrode on a second plane parallel to the workpiece in the offset direction, based on the straightness-error corrective amount stored in said storage means, and to correct the motion path on the first plane by a first corrected offset amount obtained based on the first correction amount and a predetermined offset amount depending on a wire radius and an electric discharging gap, and to correct the motion path on the second plane by a second corrected offset amount obtained based on the second correction amount, the predetermined offset amount and a predetermined taper offset amount for taper machining, to thereby determine motion paths of the upper and lower wire guides relative to the workpiece in the taper machining, wherein said storage means comprises a database provided in a controller of the wire electric discharge machine for storing a plurality of straightness-error corrective amounts for different kinds of wire electrodes and machining conditions, and the straightness-error corrective amount is selected from the plurality of straightness-error corrective amounts stored in the database in accordance with a kind of the wire electrode and a machining condition designated for the wire electric machining in the controller.

6. A wire electric discharge machine according to claim 5, wherein the straightness-error corrective amount is given by a tangent of an angle.

7. A wire electric discharge machine according to claim 5, wherein said motion path determination means obtains the first corrected offset amount on the first plane and the second corrected offset amount on the second plane different with each other, to thereby make different corrections to the motion paths on the first and second planes.

8. A wire electric discharge machine according to claim 5, wherein the straightness-error corrective amount is given by a value of an angle.

* * * * *

UNITED STATES PATENT AND TRADEMARK OFFICE
CERTIFICATE OF CORRECTION

PATENT NO.         : 6,998,561 B2
APPLICATION NO. : 10/689634
DATED              : February 14, 2006
INVENTOR(S)        : Junichi Kato et al.

It is certified that error appears in the above-identified patent and that said Letters Patent is hereby corrected as shown below:

Title Page item 57 first inside page, in line 9 of the ABSTRACT delete "substracted" and insert --subtracted-- sheet 5 of 7 in the Drawings, FIG. 6, in Box S8 delete "DVIING" and insert --DRIVING-- column 8, line 49 delete "Tc" (2nd occurrence) and insert --Td--

Signed and Sealed this

Twelfth Day of February, 2008

JON W. DUDAS
*Director of the United States Patent and Trademark Office*